Patented Aug. 8, 1950

2,518,150

UNITED STATES PATENT OFFICE 2,518,150

VAT DYESTUFFS

Jacob Koch, Basel, Switzerland, assignor to Ciba Limited, Basel, Switzerland

No Drawing. Application January 27, 1947, Serial No. 724,708. In Switzerland February 1, 1946

9 Claims. (Cl. 260—312)

According to this invention valuable vat dyestuffs are made by treating a compound of the general formula $$R_1\text{—NH—}R_2$$

in which $R_1$ represents a pyrazolanthrone radical, $R_2$ represents an anthraquinone radical containing an acylamino group as a substituent, and in which the position of the NH-group connecting the two radicals relatively to the pyrazole ring and to the acylamino-group in at least one of the nuclei $R_1$ and $R_2$ is 1:5, with a condensing agent of the type of aluminium chloride.

The compounds of the above general formula serving as starting materials may be prepared in known manner, for example, from halogen-acylamino - anthraquinones and aminopyrazolanthrones or from amino-acylamino-anthraquinones and halogenpyrazolanthrones. In order that the connecting NH-group in at least one of the two nuclei shall occupy the 5-position relatively to the pyrazole ring connected in the 1-position or to the acylamino group in the 1-position, it is necessary, in order to obtain the starting materials of the invention, to start either from 5-halogen- or 5-amino-1-acylaminoanthraquinones or 5-amino- or 5-halogen-1:9-pyrazolanthrones.

It is of advantage to use starting materials which are substituted in the pyrazole ring and contain as an N-substituent, for example, an alkyl group, advantageously an alkyl group containing at the most 4 carbon atoms, especially a methyl, ethyl or isopropyl group. As acylamino groups the starting materials may contain, for example, an amino group acylated by a carboxylic acid, advantageously an acylated amino group whose acyl radical may correspond, for example, to the radical of an aliphatic carboxylic acid, such as acetic acid, of a heterocyclic carboxylic acid, such as pyridine-3-carboxylic acid, or advantageously to the radical of an aromatic carboxylic acid, for example a benzoic acid or a cinnamic acid, all these acids, especially the aromatic acids, being capable of containing substituents, particularly nuclear substituents, such as halogens, alkoxy groups, such as methoxy groups, alkyl groups, such as methyl groups and the like.

Accordingly, there comes into consideration as starting materials, more especially: 4-(5'-benzoylamino-1'-anthraquinonyl)-amino-N-methyl-1:9-pyrazolanthrone, 5-(5'-benzoylamino-1'-anthraquinonyl)- amino - N-methyl-1:9-pyrazolanthrone, 8-(5'-benzoyl-amino-1-anthraquinonyl)- amino-N-methyl - 1:9 - pyrazolanthrone, 5-(8'-benzoylamino - 1' - anthraquinonyl) - amino- N - methyl-1:9-pyrazolanthrone and 5-(4'-benzoylamino- 1' -anthraquinonyl)- amino - N - methyl 1:9-pyrazolanthrone, in which compounds the N-methyl group may be attached to the nitrogen atom in the 9-position or to that in the 1-position and also the corresponding compounds containing an alkyl or isopropyl group instead of the methyl group.

As condensing agents there may be used in the present process the known combinations of aluminium chloride with diluents or fluxing agents, for examples, mixtures with sodium chloride, with nitromethane, with pyridine or other tertiary bases or hydrochlorides thereof, addition compounds of aluminium chloride with sulfur dioxide, if desired, in admixture with sodium chloride, and the like. Especially good results are often obtained by using addition compounds of sulfur dioxide with aluminium chloride.

The products of the invention are vat dyestuffs and can be used in known manner for dyeing and printing a very wide variety of materials, for example, fibrous materials and especially cellulose fibres, such as cotton, linen, artificial silk and staple fibres of regenerated cellulose. They can also be converted by known methods into their corresponding leuco-ester salts, for example, of sulfuric acid, and used for dyeing and printing by the methods usual for this class of dyestuffs.

The following examples illustrate the invention, the parts being by weight unless otherwise stated, and the relationship of parts by weight to parts by volume being the same as that of the kilogram to the liter:

EXAMPLE 1

4 parts of the condensation product from 4-amino-N-methyl-1:9-pyrazolanthrone and 1-chloro-5-benzoylamino-anthraquinone are introduced into a thin homogeneous melt of 33 parts of pulverized aluminium chloride and 8.8 parts of dry pulverized sodium chloride at about 120° C., and then the whole is stirred for a further hour at 120–130° C. The thickly fluid melt is then introduced into 400 parts of a mixture of ice and water. The whole is rendered acid to Congo by means of hydrochloric acid, boiled, and filtered with suction. The residue is washed neutral and dried. If necessary the product may be further purified by being vatted.

The dyestuff so obtained is a dark powder which dissolves in concentrated sulfuric acid with a bluish red coloration. It dyes cotton from a red brown alkaline hydrosulfite vat yellow-brown tints of great purity and excellent properties of fastness.

The starting material used in this example has the formula

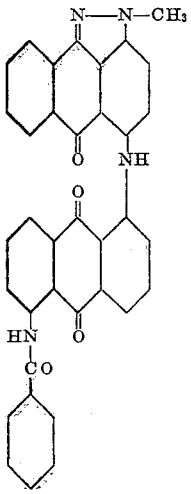

and can be obtained, for example, by heating equi-molecular quantities of 1-chloro-5-benzoyl-amino-anthraquinone and 4-amino-N-methyl-1:9-pyrazolanthrone (melting at 236–237° C.) for several hours in naphthalene with the addition of condensing agents and acid binding agents of the kind customarily used for the production of anthrimides. It melts at 345–346° C. and dissolves in concentrated sulfuric acid with a red coloration.

EXAMPLE 2

4 parts of the condensation product from 4-amino-N-methyl-1:9-pyrazolanthrone and 1-chloro-5-benzoylamino-anthraquinone are introduced into a thin homogeneous melt of 33 parts of dry pulverized aluminium chloride and 17 parts of dry pyridine hydrochloride at about 110° C., and then the whole is stirred for a further hour at 120–130° C. The thinly fluid melt is then stirred into 400 parts of a mixture of ice and water, the whole is rendered acid to Congo with hydrochloric acid, and filtered with suction. The residue is washed neutral and dried. It may, when necessary, be reprecipitated from concentrated sulfuric acid and then vatted.

The dyestuff so obtained is identical with that described in Example 1.

EXAMPLE 3

5 parts of the condensation product from 4-amino-N-methyl-1:9-pyrazolanthrone and 1-chloro-5-benzoylamino-anthraquinone are introduced into a thin homogeneous melt of 33 parts of dry pulverized aluminium chloride and 12 parts of pyridine at about 110° C., and then the whole is stirred for a further hour at 120–130° C. The product is worked up as described in Example 2.

The dyestuff so obtained is identical with that described in Example 1.

EXAMPLE 4

26.6 parts of dry pulverized aluminium chloride are heated to about 100° C. 12.2 parts of nitromethane are added whereby the temperature rises about 10° C. and the whole is then cooled to about 80° C. 4 parts of the condensation product from 4-amino-N-methyl-pyrazolanthrone and 1-chloro-5-benzoylamino-anthraquinone are then introduced into the brown liquid suspension and the whole is stirred for 2 hours at 80–90° C. The melt is thereupon stirred into 500 parts of water, the whole is heated to 70° C. and rendered acid to Congo with hydrochloric acid, and filtered with suction. The residue is washed neutral and dried. It may, when necessary, be reprecipitated from concentrated sulfuric acid and then vatted.

The dyestuff so obtained is identical with that described in Example 1.

EXAMPLE 5

12 parts of the condensation product from 4-amino-N-methyl-1:9-pyrazolanthrone and 1-chloro-5-benzoylamino-anthraquinone are introduced at 100–110° C. into a thin homogeneous melt, which has been prepared by passing dried sulfur dioxide gas over a mixture of 75 parts of dry pulverized aluminium chloride and 15 parts of dry pulverized sodium chloride. The whole is stirred for a further hour at 100–110° C. while continuing to introduce sulfur dioxide. The fluid melt is then introduced into a mixture of 1000 parts of water and 270 parts of a caustic soda solution of 36° Bé. The suspension, which has become warm, is boiled, rendered acid to Congo with hydrochloric acid, and filtered with suction. The residue is washed, extracted at the boil with 1000 parts of hydrochloric acid of 10 per cent strength, filtered with suction, washed neutral, and dried. When necessary, it may be further purified by being vatted.

The dyestuff so obtained is identical with that described in Example 1.

The dyestuffs shown in the table below can be prepared according to the same method. In this table there are indicated in the first column the components necessary for the manufacture of the starting materials and in the second column the color of the starting materials dissolved in concentrated sulfuric acid, while the properties of the resulting final product are shown in the last 3 columns.

Table

| Components of the starting material | Color of the starting material dissolved in conc. $H_2SO_4$ | Color of the final product dissolved in conc. $H_2SO_4$ | Color of the vat | Shade of the dyeing on cotton |
|---|---|---|---|---|
| 4-chloro-N-ethyl-1:9-pyrazolanthrone and 1-amino-5-benzoyl-amino-anthraquinone. | Red | bluish red | red-brown | yellow-brown. |
| 4-chloro-N-isopropyl-1:9-pyrazolanthrone and 1-amino-5-benzoyl-amino-anthraquinone. | bluish red | blue-red | do | Do. |
| 5-chloro-N-methyl-1:9-pyrazolanthrone (melting point 251–253° C.) and 1-amino-4-benzoyl-amino-anthraquinone. | green | reddish | red | red-brown. |
| 5-chloro-N-methyl-1:9-pyrazolanthrone (melting point 251–253° C.) and 1-amino-5-benzoyl-amino-anthraquinone. | yellow | blue | red-brown | orange. |
| 5-chloro-N-methyl-1:9-pyrazolanthrone (melting point 251–253° C.) and 1-amino-8-benzoyl-amino-anthraquinone. | green | violet blue | red | Do. |

Note at end of table.

Table—Continued

| Components of the starting material | Color of the starting material dissolved in conc. H$_2$SO$_4$ | Color of the final product dissolved in conc. H$_2$SO$_4$ | Color of the vat | Shade of the dyeing on cotton |
|---|---|---|---|---|
| 5-chloro-N-methyl-1:9-pyrazolanthrone of the formula 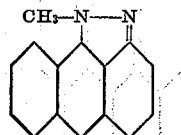 (melting point 230–231° C.) and 1-amino-4-benzolyamino-anthraquinone. | green | violet | red | red-brown. |
| 5-chloro-N-methyl-1:9-pyrazolanthrone (melting point 230–231° C.) and 1-amino-5-benzoyl-amino-anthraquinone. | yellow | blue | red brown | orange. |
| 5-chloro-N-methyl-1:9-pyrazolanthrone (melting point 230–231° C.) and 1-amino-8-benzoyl-amino-anthraquinone. | green | do | red | Do. |
| 5-chloro-N-ethyl-1:9-pyrazolanthrone and 1-amino-4-benzoyl-amino-anthraquinone. | do | violet | do | red-brown. |
| 5-chloro-N-ethyl-1:9-pyrazolanthrone and 1-amino-5-benzoyl-amino-anthraquinone. | yellow | green-blue | red-brown | orange. |
| 5-chloro-N-ethyl-1:9-pyrazolanthrone and 1-amino-8-benzoyl-amino-anthraquinone. | green | grey-blue | red | Do. |
| 5-chloro-N-isopropyl-1:9-pyrazolanthrone and 1-amino-4-benzoyl-amino-anthraquinone. | do | violet | do | red-brown. |
| 5-chloro-N-isopropyl-1:9-pyrazolanthrone and 1-amino-5-benzoyl-amino-anthraquinone. | yellow | green-blue | red-brown | orange. |
| 5-chloro-N-isopropyl-1:9-pyrazolanthrone and 1-amino-8-benzoyl-amino-anthraquinone. | green | blue | do | Do. |
| 8-chloro-N-methyl-1:9-pyrazolanthrone and 1-amino-5-benzoyl-amino-anthraquinone. | brownish green | violet | red | yellow-brown. |
| 8-chloro-N-ethyl-1:9-pyrazolanthrone and 1-amino-5-benzoyl-amino-anthraquinone. | yellow-brown | blue | do | Do. |
| 8-chloro-N-isopropyl-1:9-pyrazolanthrone and 1-amino-5-benzoyl-amino-anthraquinone. | brown-yellow | violet | do | Do. |

NOTE: The alkyl radical in the foregoing pyrazolanthrone is always linked to the nitrogen atom in the 1-position if nothing else is indicated.

EXAMPLE 6

2 parts of the dyestuff obtained as described in Example 1 are stirred with 8 parts by volume of caustic soda solution of 36° Bé. in 200 parts of water at 50° C., and vatted by the addition of 4 parts of sodium hydrosulfite. This stock vat is added to a dyebath consisting of 2000 parts of water which contains 4 parts by volume of caustic soda solution of 36° Bé. and 2 parts of sodium hydrosulfite. 100 parts of cotton are entered at 40° C., after ¼ hour 30 parts of sodium chloride are added, and dyeing is carried on at 40–50° C. for 1 hour. The cotton is then squeezed, oxidized in air, rinsed, acidified, again rinsed, and soaped at the boil. The material is dyed in fast yellow-brown tints.

What I claim is:

1. A vat dyestuff of the general formula

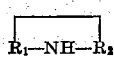

wherein R$_1$ stands for a 1:9-pyrazolanthrone radical and R$_2$ stands for a 1-benzoylaminoanthraquinone radical, wherein at least one of said radicals carries the —NH— group of the formula in 5-position, and wherein the direct bond between R$_1$ and R$_2$ interconnects β-standing carbon atoms adjacent to the —NH— group connecting α-positions of R$_1$ and R$_2$, the remaining carbon atoms in R$_1$ and R$_2$ being free from substituents.

2. A vat dyestuff of the general formula

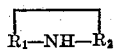

wherein R$_1$ stands for a N-alkyl-1:9-pyrazolanthrone radical and R$_2$ stands for a 1-benzoylaminoanthraquinone radical, wherein at least one of said radicals carries the —NH— group of the formula in 5-position, and wherein the direct bond between R$_1$ and R$_2$ interconnects β-standing carbon atoms adjacent to the —NH— group connecting α-positions of R$_1$ and R$_2$, the remaining carbon atoms in R$_1$ and R$_2$ being free from substituents.

3. A vat dyestuff of the general formula

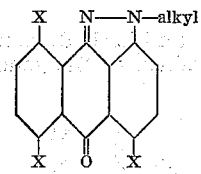

wherein two X's stand for hydrogen and the third X stands for a radical of the general formula

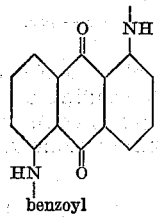

and wherein a direct carbon-carbon bond exists between the two β-standing carbon atoms adjacent to the imino group connecting the pyrazolanthrone and anthraquinone nuclei.

4. A vat dyestuff of the general formula

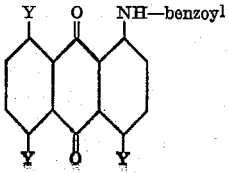

wherein two Y's stand for hydrogen and the third Y stands for a 5-imino-N-alkyl-1:9-pyrazolanthrone radical and wherein a direct carbon-carbon bond exists between the two β-standing carbon atoms adjacent to the imino group connecting the pyrazolanthrone and anthraquinone nuclei.

5. A vat dyestuff of the general formula

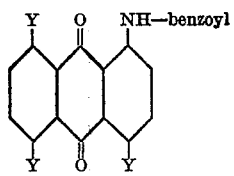

wherein two Y's stand for hydrogen and the third Y stands for a radical of the general formula

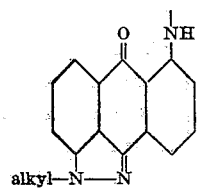

and wherein a direct carbon-carbon bond exists between the two β-standing carbon atoms adjacent to the imino group connecting the pyrazolanthrone and anthraquinone nuclei.

6. A vat dyestuff of the general formula

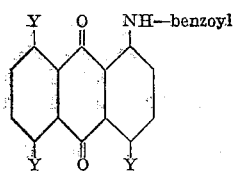

wherein two Y's stand for hydrogen and the third Y stands for a radical of the general formula

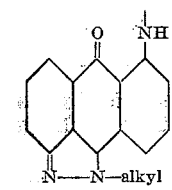

and wherein a direct carbon-carbon bond exists between the two β-standing carbon atoms adjacent to the imino group connecting the pyrazolanthrone and anthraquinone nuclei.

7. The vat dyestuff of the formula

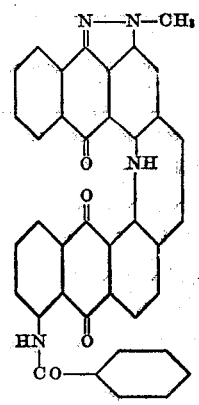

8. The vat dyestuff of the formula

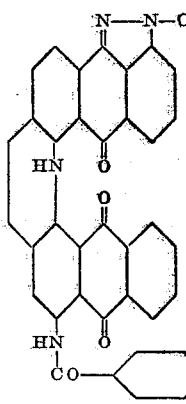

9. The vat dyestuff of the formula

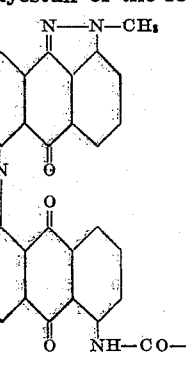

JACOB KOCH.

REFERENCES CITED

The following references are of record in the file of this patent:

UNITED STATES PATENTS

| Number | Name | Date |
|---|---|---|
| 1,877,884 | Kalischer | Sept. 20, 1932 |
| 2,136,133 | Hauser | Nov. 8, 1938 |